Oct. 30, 1962     R. L. DOYLE     3,061,343
TELESCOPING ASSEMBLY
Filed April 27, 1960     2 Sheets-Sheet 1
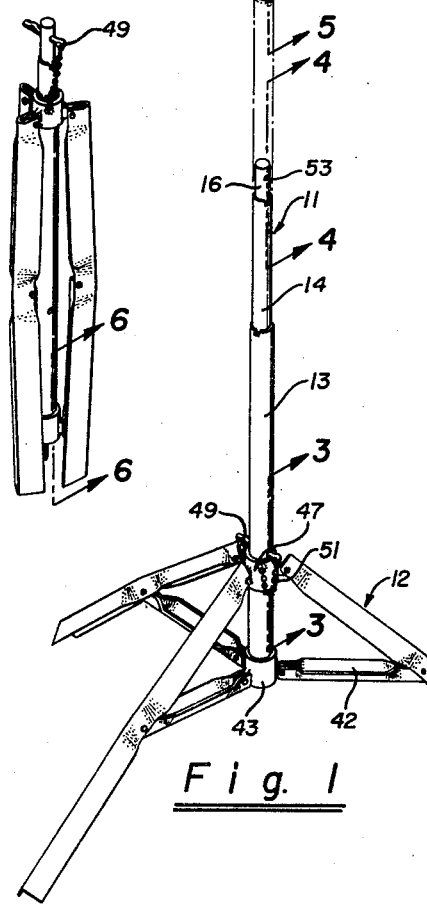
Fig. 2
Fig. 1
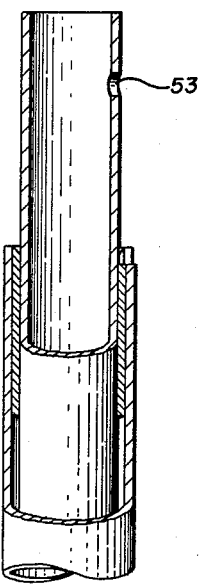
Fig. 4
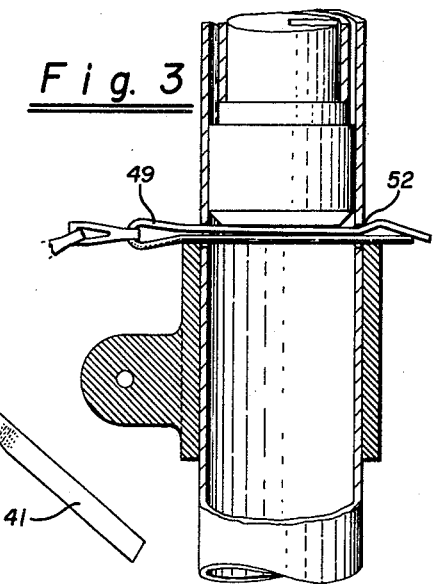
Fig. 3
INVENTOR.
Robert L. Doyle
BY Flehr & Swain
Attorneys

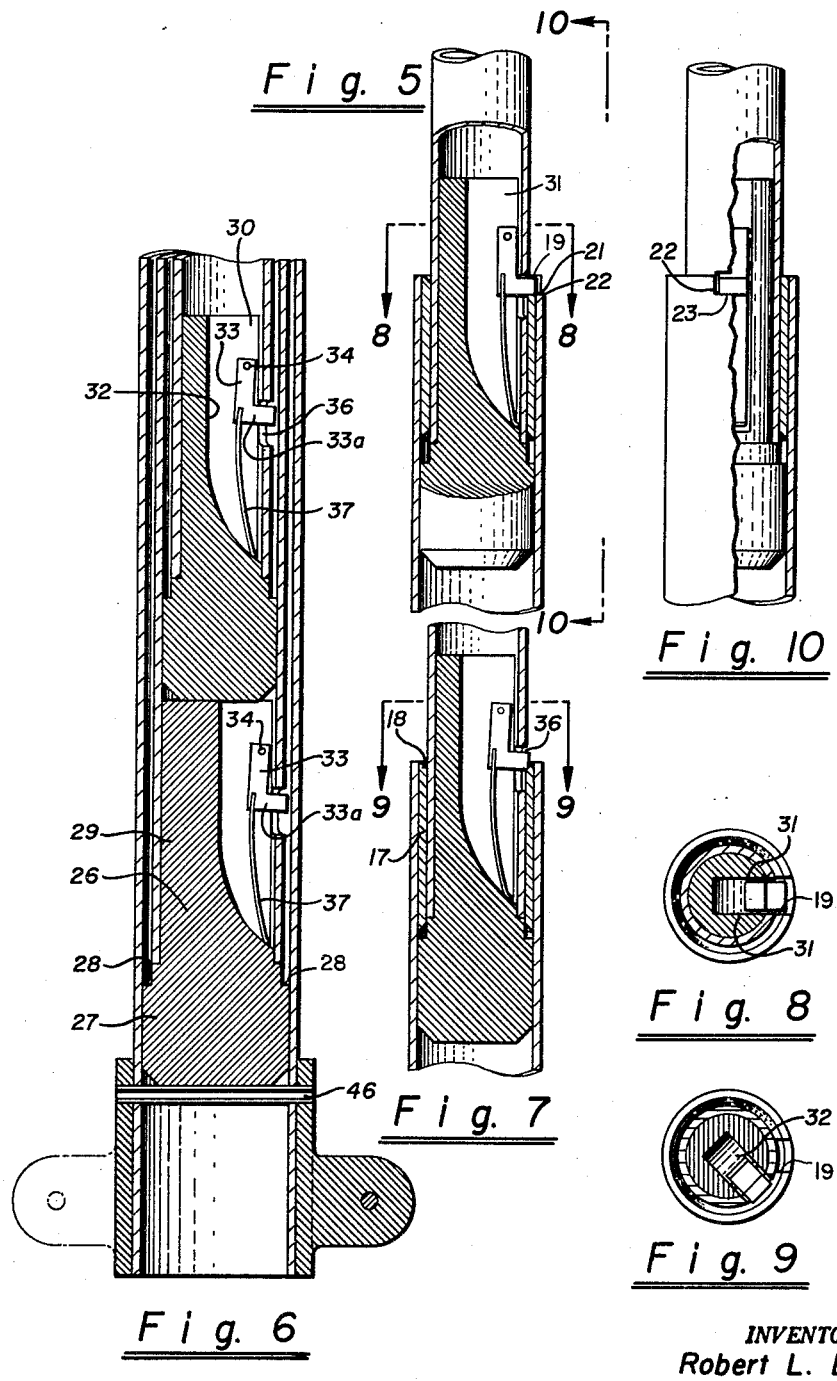

United States Patent Office 3,061,343
Patented Oct. 30, 1962

3,061,343
TELESCOPING ASSEMBLY
Robert L. Doyle, Palo Alto, Calif., assignor to Western Progress Manufacturers, Palo Alto, Calif., a partnership
Filed Apr. 27, 1960, Ser. No. 24,934
1 Claim. (Cl. 287—58)

This invention relates to a telescoping assembly and more particularly to a telescoping assembly suitable for use with warning devices.

Telescoping assemblies with collapsible tripods have heretofore been provided for warning devices. One such arrangement is shown in Patent No. 2,781,017. It has been found, however, that such collapsible tripods and telescoping assemblies have not been completely satisfactory because considerable time is required for erecting and collapsing the same. It also has been found that with such telescoping assemblies, it is not necessary to extend each section of the telescoping assembly its full length. Thus, a workman may not raise the telescoping assembly to the desired height and thereby permits him to decrease the effectiveness of the warning device mounted on the assembly. When the collapsible tripod assemblies are utilized with the telescoping assembly, it has been found that in severe winds where the entire assembly is rocked forwardly and backwardly, the legs of the tripod have a tendency to move inwardly which, in time, may be sufficient so that the device will tip over. It is, therefore, apparent that there is a need for an improved telescoping assembly for use with a collapsible tripod assembly.

In general, it is an object of the present invention to provide a telescoping assembly with a collapsible tripod which overcomes the above named disadvantages.

Another object of the invention is to provide a telescoping assembly of the above character in which each section of the telescoping assembly must be extended to its full length before the section can be locked in an extended position.

Another object of the invention is to provide a telescoping assembly of the above character in which the sections of the telescoping assembly can be rapidly and easily erected, and rapidly and easily collapsed.

Another object of the invention is to provide a telescoping assembly with a collapsible tripod of the above character in which the legs of the tripod are locked in an extended position.

Another object of the invention is to provide a telescoping assembly with a collapsible tripod of the above character in which the sections of the telescoping assembly and the legs of the tripod are locked in a collapsed position.

Additional objects and features of the invention will appear from the following description in which the preferred embodiment has been set forth in detail in conjunction with the accompanying drawings.

Referring to the drawings:

FIGURE 1 is a perspective view of the telescoping assembly and collapsible tripod in which the tripod is in an extended or erected position.

FIGURE 2 is a perspective view of the telescoping assembly and collapsible tripod in a collapsed position.

FIGURE 3 is a cross sectional view taken along the line 3—3 of FIGURE 1.

FIGURE 4 is a cross sectional view taken along the line 4—4 of FIGURE 1.

FIGURE 5 is a cross sectional view taken along the line 5—5 of FIGURE 1.

FIGURE 6 is a cross sectional view taken along the line 6—6 of FIGURE 2.

FIGURE 7 is a view similar to that shown in FIGURE 5 but with one of the sections of the telescoping assembly being telescoped.

FIGURE 8 is a cross sectional view taken along the line 8—8 of FIGURE 5.

FIGURE 9 is a cross sectional view taken along the line 9—9 of FIGURE 7.

FIGURE 10 is a view, partly in cross section, looking along the line 10—10 of FIGURE 5.

As shown in FIGURE 1 of the drawing, my telescoping assembly with collapsible tripod consists of a telescoping assembly 11 with a collapsible tripod 12 mounted on the lower end of the telescoping assembly. The telescoping assembly consists of at least two tubular sections and, as shown in the drawing, may consist of three tubular sections 13, 14 and 16. With respect to each two adjacent sections, one section can be considered to be the outer section, whereas the other section telescoping within it can be considered to be the inner section. For example, with respect to tubular sections 13 and 14, the tubular section 13 can be considered to be the outer section, whereas section 14 can be considered to be the inner section. With respect to the sections 14 and 16, section 14 can be considered to be the outer section and section 16, the inner section.

Within each of the tubular sections of the telescoping assembly except the uppermost section, an annular member 17 is fixed in the upper portion of the section so that its top surface is substantially flush with the upper surface of the tubular section in which it is mounted. The annular member 17 is provided with an inwardly sloping or tapered face 18 as shown particularly in FIGURES 5 and 7 of the drawings. The annular member 17 is also provided with a rectangular notch 19 which has substantially straight side walls and a flat bottom wall 21. The flat bottom wall 21 extends in a plane which is at right angles to the axis of the tubular section. The notch 19 in the annular member 17 is in alignment with a similar notch 22 provided in the upper end of the tubular section in which the annular member 17 is mounted. This notch 22 is also provided with a flat bottom wall 23 similar to wall 21.

A suitable retaining member 26 is mounted in the lower end of each of the tubular sections except the lowermost section and, as shown in the drawings, can be in the form of a solid machined member. The retaining member is provided with a portion 27 which extends below the tubular member in which it is mounted. As can be seen from the drawing, the portion 27 has a diameter which is slightly smaller than the diameter of the tubular section in which it is slidably mounted and a diameter greater than the inner diameter of the annular member 17 to prevent removal of the inner tubular section upwardly through the outer tubular member. To this end, the portion 27 is provided with an annular shoulder 28 which is adapted to engage the lower surface of the annular member 17 fixed to the tubular section in which the retaining member is slidably mounted.

The upper portion 29 of the member 26 is provided with an elongated deep-seated slot 30 having substantially straight side walls 31 and an end wall 32 which is substantially vertical at its upper end and which gradually tapers towards the horizontal near the bottom end of the slot.

An L-shaped pawl 33 is pivotally mounted within the forward end of the slot 30 by a pin 34. The pawl is mounted in such a manner that the lower leg portion 33a is adapted to extend through an opening 36 provided in the tubular member in which the retaining member 26 is mounted. Suitable means such as leaf spring 37 fixed to the pawl and extending downwardly therefrom and engaging the end wall 32 is provided for yieldably urging the pawl 33 through the opening 36.

The tripod 12 consists of three legs 41 which, as shown, are formed of angles. The intermediate portion of the legs 41 are pivotally connected to braces 42 which are pivotally connected to a collar 43 fixed to the lower end of the lower tubular section 13. The collar 43 is fixed to the section 13 by suitable means such as the pin 46 shown in FIGURE 6. The upper ends of the legs 41 are pivotally connected to a collar 47 which is slidably mounted on the lower tubular section 13.

A suitable locking device such as the cotter pin 49 is secured to the collar 47 by a suitable elongate flexible member such as the chain 51. The lower tubular section 13 is provided with a hole 52 which is adapted to receive the cotter pin 49 for a purpose hereinafter described, and the upper end of the upper tubular section 16 is provided with a hole 53 also for a purpose hereinafter described.

Operation and use of the telescoping assembly with the collapsible tripod may now be briefly described as follows. Let it be assumed that the telescoping assembly and tripod are collapsed as shown in FIGURE 2. When in this position, the cotter pin 49 extending through the hole in the top tubular section 16 locks the tubular sections in place so that they cannot accidentally become extended. The legs of the tripod are also locked in place so that they cannot be spread apart because the cotter pin 49 is secured to the top collar 47 of the tripod assembly.

Now let it be assumed that it is desired to erect the telescoping assembly and the tripod. The cotter pin 49 is first removed and the legs of the tripod are spread apart to the position shown in FIGURE 1. The section 14 is lifted slightly and the cotter pin 49 is placed in the hole 52 in the lower tubular section 13.

After the tripod legs have been spread apart and locked in place, the telescoping assembly may be easily erected by pulling up one section at a time, starting with the section 14 and continuing to lift section 14 until the opening 36 is exposed to allow the pawl 33 to extend through the opening and over the annular member 17. As soon as the pawl 33 has been extended through the opening, the tubular section is rotated until the pawl 33 is in alignment with the notches 19 and 22. The section is then allowed to drop so that the pawl seats in the notches 19 and 22 and engages the lower flat surfaces of the notches. Engagement of the pawl in this manner locks the tubular section 14 in place. The lower surface of the pawl 33 in this position lies in a plane parallel to the flat surfaces of the notches and, for that reason, the pawl 33 will not be forced inwardly as weight is applied to the sections it supports.

After the section 14 has been extended and locked in place, the next section is extended and locked in place in the same manner. This same operation is continued until all of the sections have been extended. Before or after extension of the telescoping assembly, suitable warning devices such as the devices shown in Patents No. 2,781,017, Des. 183,604, and Des. 183,687 can be mounted on the telescoping assembly.

It has been found that the construction of my telescoping assembly is particularly advantageous because each section must be extended to its full length before it can be locked into place. This prevents the workman from only extending each section only a part of its total length and thereby decreasing the effectiveness of any warning device mounted on the telescoping assembly.

With the tripod legs 41 locked in the position shown in FIGURE 1, it is impossible for the collar 47 to shift upwardly and for the lower ends of the legs 41 to move inwardly as the tripod rocks back and forth in the wind. Heretofore, without such locking means, it has been found that the collar would slide upwardly and the bottom ends of the legs would move inwardly so that the warning device would actually tip over in the wind after a relatively short time.

When it is desired to collapse the tripod and the telescoping assembly, it is merely necessary to lift the section which it is desired to telescope so that the pawl is lifted out of the notches 19 and 22. The tubular section is then rotated slightly so that the pawl overlies the bevelled or inclined portion of the annular member 17. Then with a slight downward pressure on the tubular member, the pawl is urged inwardly by the bevelled surface 18 on the tubular member 17 against the force of the yieldable spring 37. As soon as the pawl 33 has been forced inwardly so that it will clear the inner surface of the annular member 17, the tubular section can be telescoped within the outer tubular section. In the same manner, the other tubular section can be telescoped until they are in the position as shown in FIGURES 2 and 6. The pin 46 in the collar 43 prevents the tubular sections from dropping through the collar 43.

Thereafter, the tripod can be collapsed by removing the pin 49 and slipping the collar 47 upwardly until the legs are in the position shown in FIGURE 2.

It is apparent from the foregoing that I have provided a new and improved telescoping assembly for use with a collapsible tripod which has many advantages over conventional apparatus of this type. It is of a type which can be readily manufactured and assembled at very low cost.

I claim:

In a telescoping assembly, at least two telescoping cylindrical tubular sections, one of said sections being an inner section and the other being an outer section, a cylindrical collar fixed in one end of said outer section and with said inner section extending slidably and rotatably therethrough, the innermost end of said collar defining an axially facing shoulder, a retaining member fixed in the lower end of said inner section and having a stop portion extending radially therefrom to engage said shoulder and limit upward movement of said inner section, a pawl mounted in said inner section and projecting from an opening therein positioned above said lower end a distance slightly greater than the length of said collar, means urging said pawl outwardly of said opening a distance sufficient to overlie the upper edge of said collar, the upper edge of said collar having an inwardly bevelled portion and a flat portion, for selective engagement by said pawl, said collar being provided with a notch with said flat portion being in the bottom of said notch.

References Cited in the file of this patent

UNITED STATES PATENTS

| | | |
|---|---|---|
| 1,863,442 | Goodman | June 14, 1932 |
| 2,165,426 | Tuttle | July 9, 1937 |
| 2,273,791 | Wirgin | Feb. 17, 1942 |